United States Patent [19]

Rottmayer

[11] Patent Number: 5,446,613
[45] Date of Patent: Aug. 29, 1995

[54] MAGNETIC HEAD ASSEMBLY WITH MR SENSOR

[75] Inventor: Robert E. Rottmayer, Fremont, Calif.

[73] Assignee: Read-Rite Corporation, Milpitas, Calif.

[21] Appl. No.: 203,225

[22] Filed: Feb. 28, 1994

[51] Int. Cl.⁶ .................................. G11B 5/39
[52] U.S. Cl. .................................. 360/113
[58] Field of Search .......... 360/113, 110, 119, 120, 360/122, 125, 126; 29/603

[56] References Cited

U.S. PATENT DOCUMENTS 4,881,143  11/1989  Bhattacharyya et al. ........... 360/113
5,010,433   4/1991  Kitada et al. ...................... 360/113
5,168,409  12/1992  Koyama et al. .................... 360/122
5,247,413   9/1993  Shibata et al. ..................... 360/113
5,272,582  12/1993  Shibata et al. ..................... 360/126

Primary Examiner—A. J. Heinz
Assistant Examiner—David L. Ometz
Attorney, Agent, or Firm—Nathan N. Kallman

[57] ABSTRACT

A thin film magnetic head incorporates an inductive write portion including two pole/shield layers and a read portion including a giant magnetoresistive (GMR) element. The pole/shield layers are relatively thick and serve as conductive leads which can carry high current with minimal heating and low current density. The GMR element defines data track width and thus minimizes off-track reading of data.

7 Claims, 5 Drawing Sheets

MAGNETIC HEAD ASSEMBLY WITH MR SENSOR

FIELD OF THE INVENTION

This invention relates to a thin film magnetic head assembly and in particular to a read/write head or transducer incorporating a magnetoresistive sensing read element.

DESCRIPTION OF THE PRIOR ART

Presently known magnetic head assemblies are fabricated with an inductive write head and a magnetoresistive (MR) read dement. Typical inductive write heads incorporate thin film Permalloy layers, designated as P1 and P2 respectively, that form a magnetic circuit with a transducing gap, as is well known. During the write mode, magnetic flux representative of a data signal emanates from the write gap and a signal is registered on tracks of a rotating disk that is dose to the write transducing gap.

A problem that is encountered with head assemblies using MR read elements is the topology of the conductive leads which can result in electromigration due to high current densities, electrical shoring of leads and the MR element to the shields, and the electrical resistance and heating of the leads and MR element.

SUMMARY OF THE INVENTION

An object of this invention is to provide a thin film magnetic head assembly for high density recording with reduced complexity and read/write offset.

Another object, is to provide a thin film magnetic head assembly wherein the possibility of electrical shorting is effectively eliminated.

A further object is to provide a thin film magnetic head assembly having low current density and reduced heating and reduced electromigration during operation.

According to this invention, a thin film read/write magnetic head assembly includes an inductive write head with a magnetoresistive read head formed with an giant MR (GMR) sensor element in the gap of the write head. The inductive head includes first and second poles designated as P1 and P2 layers respectively made of a ferromagnetic material such as Permalloy, which form a magnetic circuit with a transducing write gap. The magnetic pole layers, designated as P1 and P2, are made of a high magnetization (Bs) material having high permeability and able to conduct current, which may be NiFe, FeN or FeNTa, by way of example. The P1 and P2 pole layers serve as write poles as well as magnetic shields and leads, and are designated hereinafter as P1/S1 and P2/S2 layers respectively. The shields S1 and S2 act to reduce the side reading of the GMR element and to shape the signal waveform. During writing, the GMR element is saturated and the write gap is determined by the thickness of the GMR element and associated conductive leads disposed adjacent to the GMR element. In accordance with this invention, the two thick magnetic P1 and P2 pole layers serve as conductive leads as well as write poles and shields. The P1 and P2 write poles are made relatively thick to enable relatively high current to be used with low current density and with minimal heating.

The GMR read sensor is characterized by high sensitivity. Typical GMR devices are described in the Journal of Applied Physics, Vol. 73, No. 10, May 15, 1993, pages 5309-5314 and the IEEE Journal on Magnetics in Japan, Vol. 7, No. 9, September 1992, pages 2482-2487. An improved GMR sensor element of the type that may be used with the GMR head of this invention has been developed at the Livermore Laboratories at Livermore, Calif. The GMR element is typically formed in a patterned multilayer structure, which may use Cu/Co or Fe/Cr material, for example. In keeping with this invention, the GMR film is oriented so that the bias current that is applied to the GMR film is perpendicular to the plane of the film, or in a Cpp mode,, which allows the shields S1 and S2 to be used as conductive leads. Thus, the typical problems of topology, electromigration, heating and electrical shorting experienced with prior art MR head assemblies are virtually eliminated. Conductors which space the GMR film from shields S1 and S2 provide magnetic decoupling between the GMR film and the shields and form the write gap. Track width is defined by the width of the GMR film so off-track reading of the recorded signals is minimized.

BRIEF DESCRIPTION OF THE DRAWINGS

The invention will be described in greater detail with reference to the drawings in which.

DETAILED DESCRIPTION OF THE PREFERRED EMBODIMENT

Figure 1:
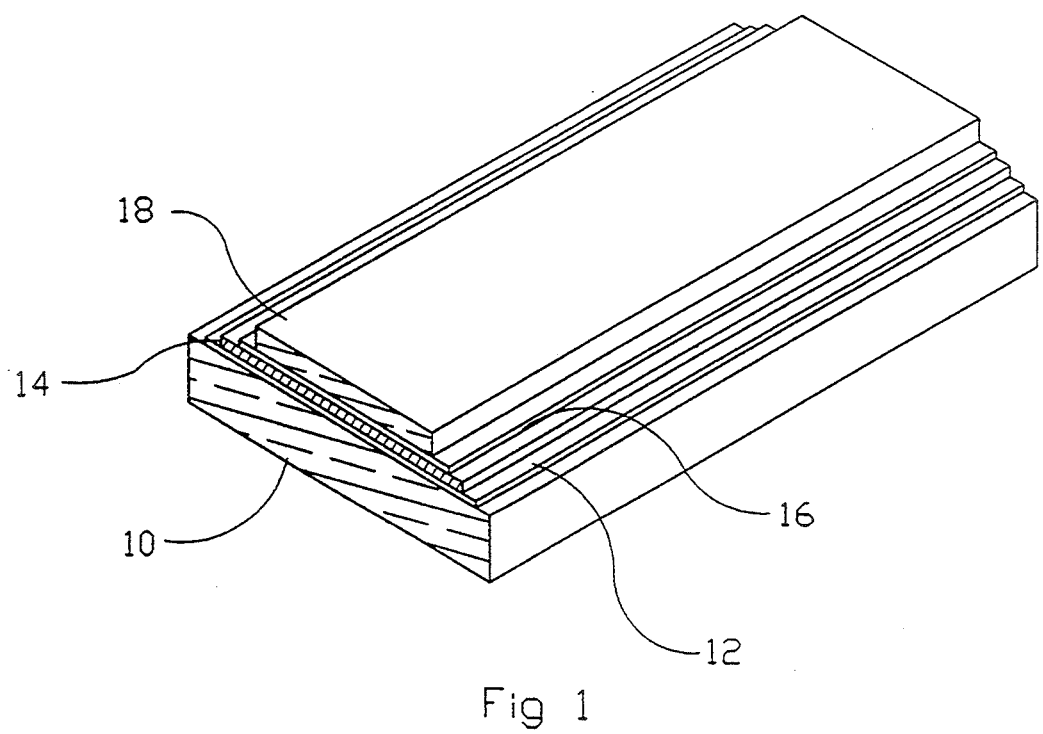
FIG. 1 is an isometric view of a magnetic head assembly incorporating an inductive write section and a GMR read section, in accordance with this invention.

With reference to FIG. 1, a magnetic head structure which is formed on a nonmagnetic ceramic substrate (not shown) incorporates an inductive write portion with write magnetic poles and a read portion including a magnetoresistive GMR element. The inductive write portion includes a first pole layer 10, which is designated as a P1/S1 layer, preferably made of Permalloy, that is vacuum deposited or plated on the substrate. The P1/S1 layer 10 serves as a first write pole P1 and shield S1. A conductive layer 12 is formed on the P1/S1 layer 10. A giant magnetoresistive element (GMR) 14 is then vacuum deposited on the conductive layer 12. A second conductive layer 16 is then formed over the GMR layer 14. The conductors 12 and 16 space the GMR element 14 from the shields S1 and S2, associated with the P1 and P2 pole layers 10 and 18, and provide magnetic decoupling between the shields and the GMR element 14. The inductive portion of the magnetic head structure is completed by plating or vacuum depositing the P2/S2 layer 18 which serves as a second write pole P2 and a second shield S2. The write poles P1 and P2 are insulated from each other and form conductive leads. The back gap is formed with a low reluctance in the magnetic circuit, as is well known.

Figure 2:
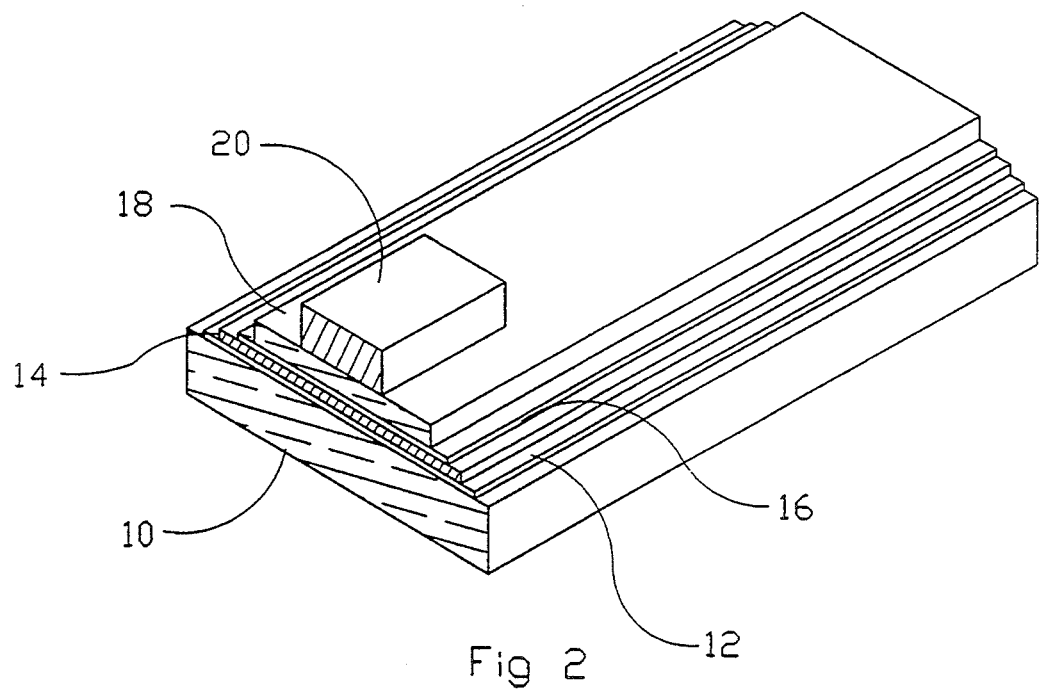
FIG. 2 is an isometric view showing the addition of a photoresist mask disposed on the structure of FIG. 1.
Figure 3:
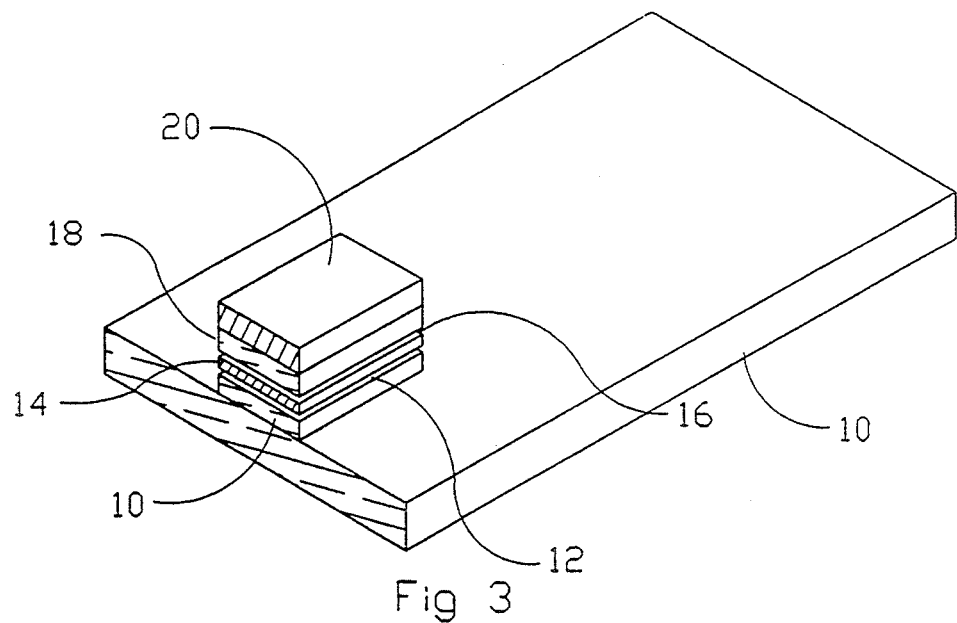
FIG. 3 is an isometric view showing the structure of FIG. 2 processed to define the masked portions of the different layers.

With reference to FIG. 2, a photoresist mask 20 is laid down over the P2/S2 layer 18 to define the P2/S2 layer, the GMR element 14, the conductive layers 12 and 16 and a portion of the P1/S1 layer 10. By etching these layers, the extended P1/S1 layer 10 remains as shown in FIG. 3. During the etch process, the conductors 12 and 16 and the P2/S2 layer 18 protect the GMR element 14. The etch penetrates partially into the P1/S1 layer 10 to form a write structure about the GMR element 14.

The P1/S1 and P2/S2 layers 10 and 18 respectively are formed of a high magnetization Bs material having high permeability, such as NiFe, FeN or FeNTa. The layer 10 is preferably about two microns thick. The GMR element 14 is preferably about 500 Angstroms thick, and the width is about 0.5 to 2 micrometers, wherein the length to width ratio varies from 1:1 to 5:1. The data track width is defined by the width of the GMR element 14 whereby off-track reading is minimized. The patterning of the track width can be accomplished by a single step using planar geometry to yield high accuracy. The GMR element 14 provides alternating layers of magnetization in opposite directions. An applied field switches the magnetization to the same direction resulting in a large change in magnetization sensed through the pole/shield leads. The GMR element 14 is preferably made of alternating layers of copper and cobalt, each layer being about 20 Angstroms thick. The conductive layers 12 and 16 are made of a conductive material, such as copper, to a thickness of about 100 to 200 Angstroms or thicker if required for the write gap, and have substantially the same length and width as the GMR element.

Figure 4:
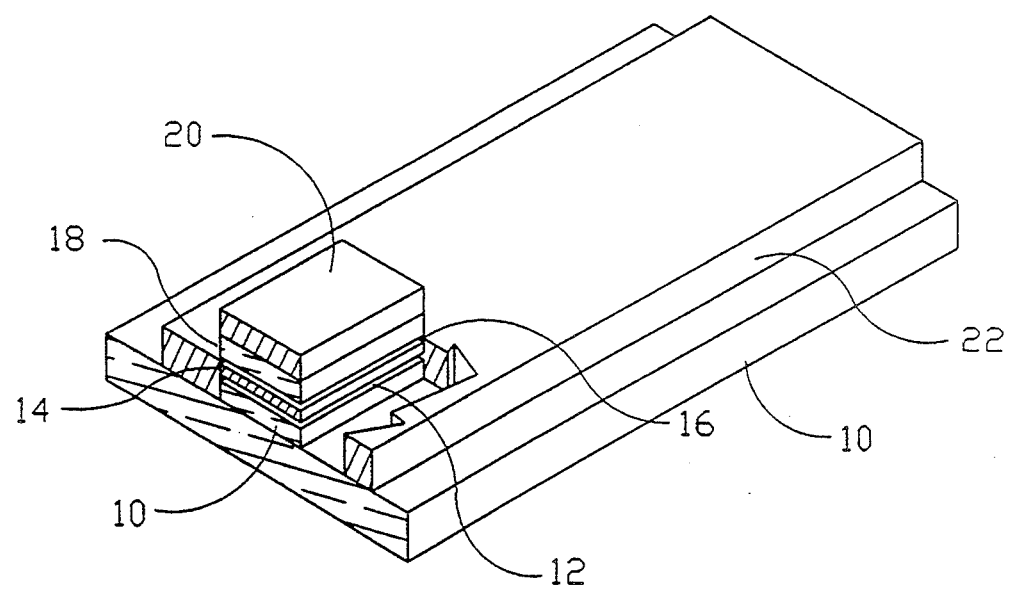
FIG. 4 is an isometric view showing a photoresist mask over the extended portion of the P1/S1 layer illustrated in FIG. 3.
Figure 5:
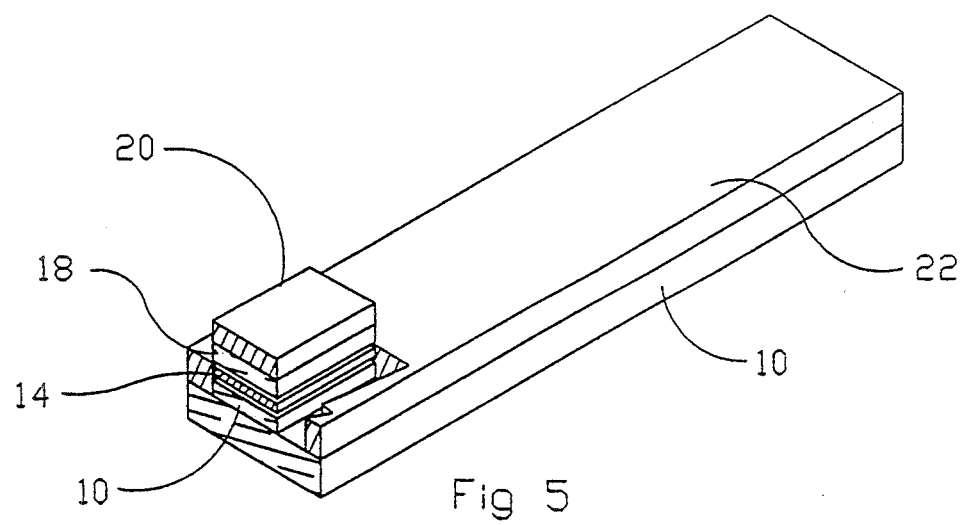
FIG. 5 is an isometric view of the structure of FIG. 4 showing the trimmed P1/S1 layer extension.
Figure 6:
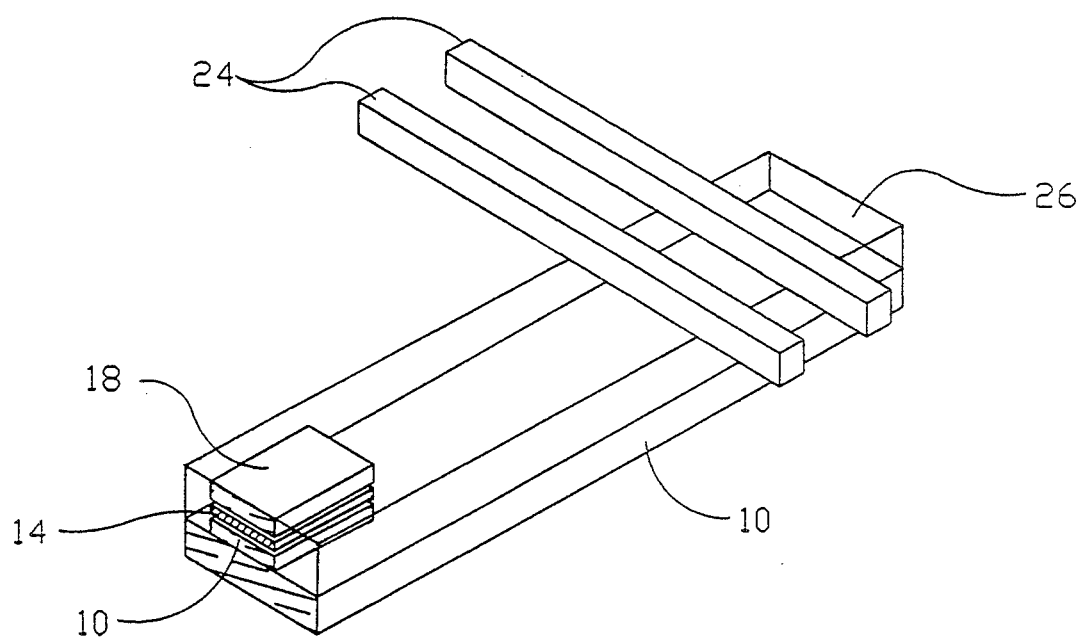
FIG. 6 is an isometric view of the structure of FIG. 5 with conductive coil elements disposed over the P1/S1 layer.

As illustrated in FIG. 4, a photoresist mask 22 is deposited over the extended P1/S1 layer 10, and the photoresist is developed to define the structure depicted in FIG. 5. As shown in FIG. 6, an insulating layer 26, which may be made of aluminum oxide for example, or a thermoset resin with good planarizing properties such as benzocyclobutene (BCB) is formed over the extended P1/S1 layer 10 to define the nonmagnetic transducing gap. The gap 26 is located over the P1/S1 pole 10 and around the GMR element 14, and covers the entire head structure. The gap 26 is opened to the P2/S2 pole layer 18 by etching. Conductive coil elements 24 (two elements shown in FIG. 6 and four elements in FIGS. 7-8) are provided over the gap layer 26 to act as the write coil for conducting data signals to and from the magnetic head. The write coil 24 may have two or four turns or more depending upon the write field needed in the read/write system.

Figure 7:
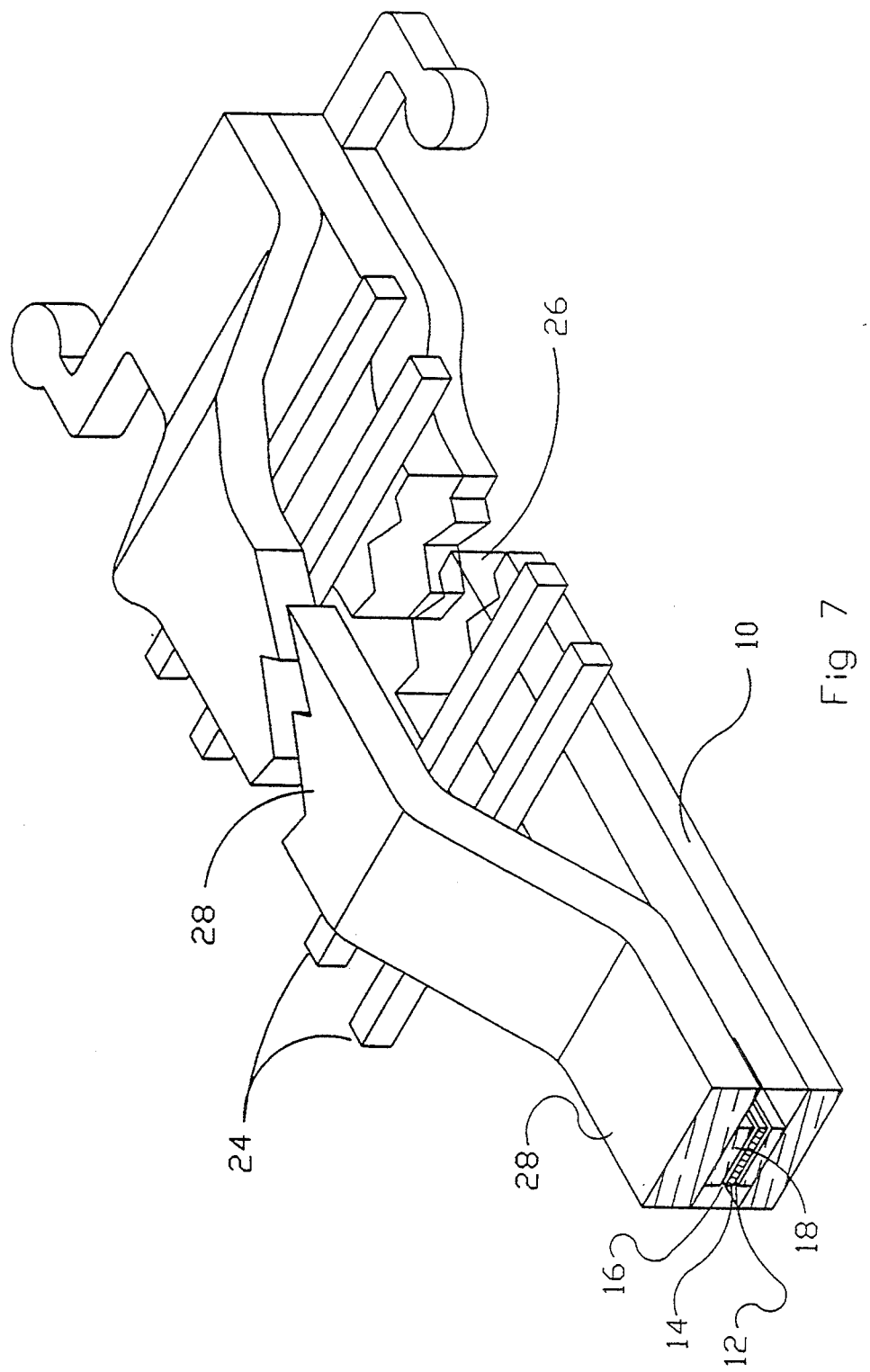
FIG. 7 is an isometric view including the upper part of the P2/S2 layer.
Figure 8:
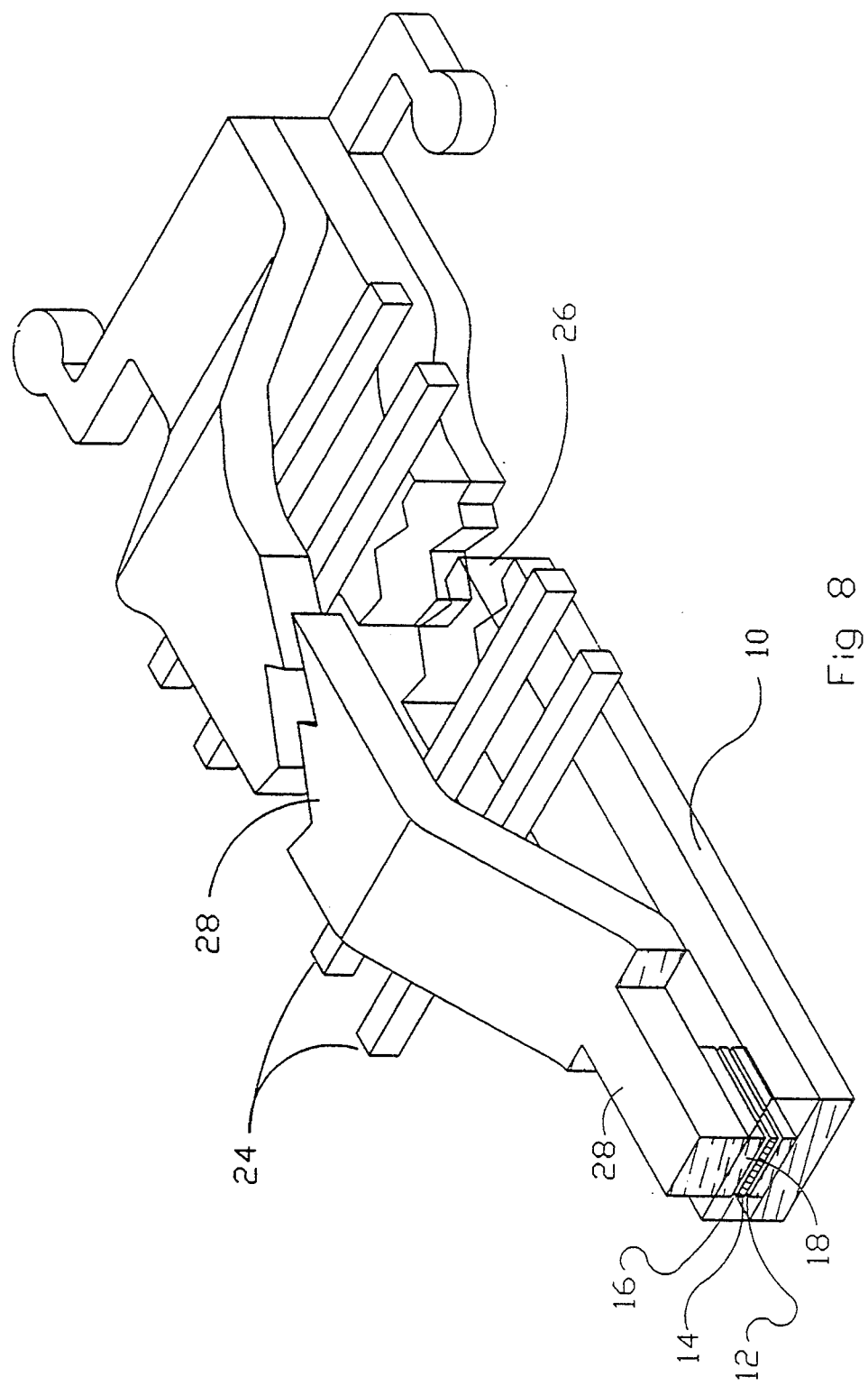
FIG. 8 is an isometric view showing the upper part of the P2/S2 layer milled away.

In FIG. 7, an upper portion 28 of the P2/S2 formation is deposited, as is well known, over the insulation (not shown for clarity of illustration of the MR assembly) surrounding the write coil elements 24 to complete the magnetic circuit and provide a second conductive lead. FIG. 8 shows the structure of FIG. 7 with part of the P2/S2 layer 18 milled away so that the sides of the portion 18 coincides with the sides of the GMR element 14 and conductive layers 12 and 16. Conductive leads are attached to the coil elements 24 to enable signal transmission to external circuitry. In operation, write current is applied through the coil elements 24. Sense current is directed through one of the write poles P1 or P2 and through the GMR element 14 and the current is passed out through the other write pole P1 or P2. The GMR element operates in a Cpp mode to change its resistance by the GMR effect when a transition excites the head. Thus the poles P1 and P2 act as write poles, read poles and conductive leads.

By virtue of the magnetic head structure disclosed herein, a simplified read/write head is provided with a large single gap to accommodate a GMR element that is disposed within the gap to afford improved disk drive performance by eliminating the read to write gap offset which typically requires correction in rotary head positioner drives. The patterning and orientation of the GMR element provides a well-defined track width that is easily controlled. Electrical shorting and other problems experienced with conventional MR heads are eliminated.

What is claimed is:

1. A thin film magnetic read/write head comprising:
   first and second magnetic pole layers that serve as write poles, magnetic shields, and conductive leads for providing a magnetic and electrical circuit;
   a read portion including a giant magnetoresistive element disposed between said first and second magnetic pole layers, said first and second magnetic pole layers providing shielding of said giant magnetoresistive element from fringing magnetic flux, said first and second magnetic pole layers providing a conductive path to conduct sense current to said giant magnetoresistive element in a read mode;
   a first electrically conductive layer disposed between said first magnetic pole layer and said giant magnetoresistive element for providing magnetic decoupling between said giant magnetoresistive element and said first magnetic pole layer, and
   a second electrically conductive layer disposed between said second magnetic pole layer and said giant magnetoresistive element for providing magnetic decoupling between said giant magnetoresistive element and said second magnetic pole layer;
   whereby off-track reading of data is minimized.

2. A thin film magnetic read/write head as in claim 1, wherein said first and second magnetic pole layers consist essentially of a high magnetization material having high permeability and are electrically conductive.

3. A thin film magnetic read/write head as in claim 2, wherein said material is NiFe or FeN or FeNTa.

4. A thin film magnetic read/write head as in claim 1, wherein said first and second magnetic pole layers are each about two microns thick.

5. A thin film magnetic read/write head as in claim 1, wherein said giant magnetoresistive element is about 500 Angstroms thick.

6. A thin film magnetic read/write head as in claim 1, wherein said giant magnetoresistive element is about 0.5 to 2 microns wide and the length-to-width ratio of said element is in the range of 1:1 to 5:1.

7. A thin film magnetic read/write head as in claim 1, wherein said giant magnetoresistive element is made of alternating layers of a conductor from the group of copper, gold or silver, and a magnetic alloy from the group of alloys consisting essentially of iron, cobalt and nickel.

* * * * *